April 12, 1955    F. C. MOCK    2,705,829
METHOD OF FORMING A SLEEVE WITH RADIAL ORIFICES
Filed Nov. 15, 1949

INVENTOR.
FRANK C. MOCK
BY
ATTORNEY

United States Patent Office 2,705,829
Patented Apr. 12, 1955

2,705,829

METHOD OF FORMING A SLEEVE WITH RADIAL ORIFICES

Frank C. Mock, South Bend, Ind., assignor to Bendix Aviation Corporation, South Bend, Ind., a corporation of Delaware Application November 15, 1949, Serial No. 127,482

4 Claims. (Cl. 29—157.1)

This invention relates to fluid metering devices and more particularly to the method of manufacture of such devices.

In the manufacture of fluid controls of the type used for controlling fuel to engines, extreme accuracy in machining and assembling the parts is of utmost importance. Jet engines, for example, require that fuel metering devices provide not only carefully regulated fuel feed but also that the fuel be distributed equally to a plurality of chambers or burners. The present state of the art does not furnish a distributing device of sufficient accuracy for the required purpose.

The problems encountered in accurately locating and making openings or orifices in hollow members of substantial thickness, such as a sleeve or housing are legion. For example, where the openings or orifices to be made are round and the machining is done from the exterior of the member or work, it is generally recognized that a properly sharpened tool bit must be used and that extreme care be exercised in performing the drilling operation. Even this simple drilling operation presents such problems as "run out." Also where a plurality of openings of identical size are to be made, as in the fabrication of the device of the invention, resharpening of the tool is frequently required to obtain the best results. The objection to frequently resharpening the tool resides in the fact that each time the tool is sharpened the cutting edge is changed which in effect produces an opening of relatively different shape and size.

Where an irregular shaped opening is desired, such as a V-shaped orifice, a broaching operation will no doubt be recommended. Here again, however, there arises a problem in maintaining close tolerances and in keeping the several openings of identical area and geometry. Actually the changes of error are multiplied with this operation since the broaching tool must be guided in a previously drilled hole which acts as a pilot for the tool. At best the broached opening can be only as accurate as the drilled hole which as aforementioned is subject to discrepancies. Furthermore as the broaching tool becomes dull the openings formed will inevitably change their shape and area. Sharpening the broach tool, will, as in the case of the drill produce openings unlike in shape and area to those previously formed.

The aforesaid operations are all performed from the exterior of the hollow member or work. Under certain conditions it may be impossible to form the openings from the outside of the work. In the latter case attempts have been made to perform machining operations from the inside where the diameter of the work and other factors will permit accessibility, but without satisfactory results where accuracy is of the essence. Where the diameter of the work is small, thus precluding the insertion of properly supported tools within the work the inherent inaccuracy in machining is exaggerated. To overcome these problems I have developed an entirely new technique to be hereinafter described in more detail.

It is therefore an object of the invention to provide an extremely accurate method of forming orifices in a sleeve for use in a fluid metering device.

Another important object of the invention resides in the provision of a method of making metering devices with orifices which pass equal amounts of fluid.

A further important object of the invention resides in the provision of a method of making metering devices with orifices between which the flow will not vary more than four per cent.

A primary purpose of this invention is to provide a flow divider having a plurality of variable area orifices accurately located within a hollow member in which a piston is slidably fitted for simultaneously exposing equal areas of the orifices to a fluid source acting on an end of the piston, and tending to move the same as a function of the pressure of the fluid acting on said end, whereupon the distribution of the fluid from the orifices is uniform.

The device of this invention receives the total metered fuel from a main fuel control, not shown, and distributes the fuel in equal amounts to each nozzle of a burner, thus decreasing the amount of flow variation between individual nozzles.

Figure 1:
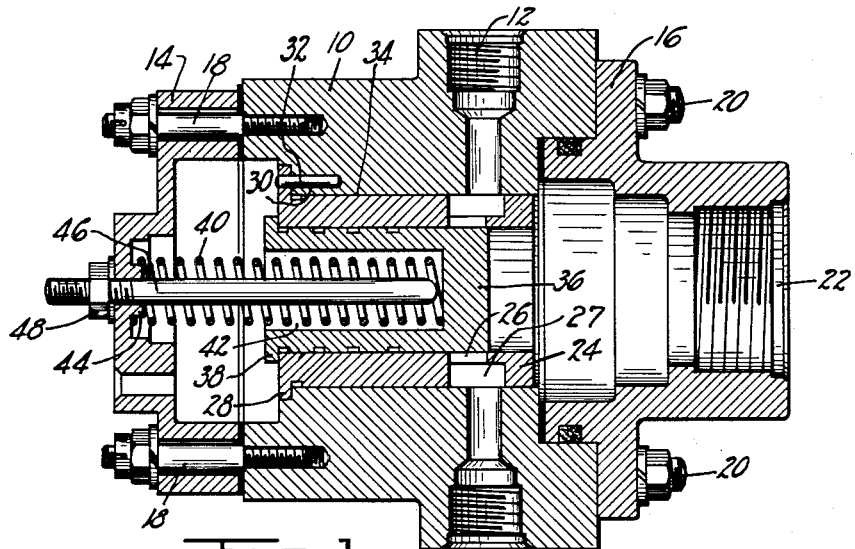
Figure 1 is a longitudinal sectional view of one form of device with which the invention is practiced.

Referring now to Figure 1 of the drawing the reference numeral 10 designates a housing provided with radially extending outlet passages 12. Covers 14 and 16 are fit over the ends of the housing 10 and secured thereto by studs 18 and 20, respectively. The cover 16 is formed with an inlet opening 22 adapted to be connected to a fluid source, not shown. The inlet 22 communicates with the interior of a sleeve 24, which is formed with a plurality of orifices 26 spaced around the sleeve's interior so as to lie in a plane transverse to the axis of the sleeve. The sleeve 24 is equipped with a flange 28 drilled at 30 to receive a pin 32 which engages the housing 10 to thereby locate the sleeve in the housing so that the orifices 26 are in registry with the passages 12. The housing 10 is heated to a prescribed temperature to thereby expand bore 34 to receive the sleeve 24. After inserting the sleeve 24 into the housing bore, the housing is cooled so as to provide a shrink fit such that there can be no space between the exterior of the sleeve 24 and the housing bore 34. This shrink fit will prevent leakage between the orifices 26 and adjacent passages 12.

Figure 2:
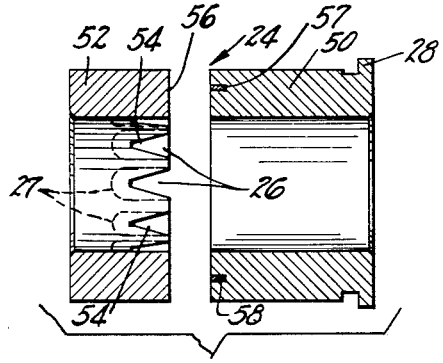
Figure 2 is a view in section of the sleeve member of the device of Figure 1 before welding.
Figure 3:
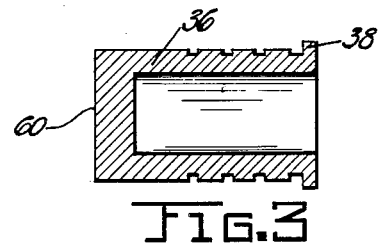
Figure 3 is a view in section of the piston member.
Figure 4:
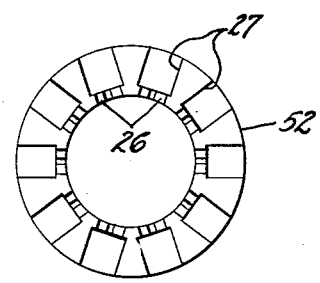
Figure 4 is an end view of one section of the sleeve member of Figure 2.

The accuracy required in locating the radial passages 12 in the housing 10 is not beyond that necessary for ordinary machining operations. There can be some run out, for example, where these passages terminate in the housing bore. This inaccuracy is offset by enlarging the orifices 26 in the exterior wall of the sleeve. This is done by milling recesses 27 in the end of the exterior wall of the sleeve, as best shown in Figures 2 and 4. The sleeve 24 is made with a relatively heavy wall to minimize the likelihood of distortion after being fit into the housing bore 34. The interior of the sleeve 24 is finish machined after positioning the same in the bore 34. The concentricity between the interior and exterior walls of the sleeve must be within .0002 inch.

To meter the flow of fluid past orifices 26, and the outlet openings 12, a piston 36 is slidably positioned in the sleeve 24. One end of the piston 36 is enlarged at 38 for engagement with one end of the sleeve for limiting movement of the piston in one direction. This enlarged portion 38 of the piston is normally urged against the end of the sleeve under the influence of a spring 40, which has its free end carried in the hollow portion 42 of the piston, and its other end encircling a hub 44 of the cover 14. The cover 14 and hub 44 are drilled and threaded to accommodate the threaded end of a pin 46, provided with a locknut 48 for retaining the pin in its selected position. The adjustment of this pin controls the movement of the piston to the left and hence the maximum orifice opening.

It is obvious that fluid under pressure at the inlet 22 acts on the right end of piston 36 tending to urge it to the left against the spring 40 to uncover the orifices 26, to thereby allow equal amounts of fluid to pass into the outlet openings 12 of which there is one for each of the orifices 26. Obviously there may be as many orifices per outlet opening as desired depending upon the flow requirements.

The invention herein disclosed resides in the method of accurately locating the orifices and in assembling the device for equal distribution of flow therethrough. As best illustrated in Figure 2 the sleeve 24 is made from two pieces 50 and 52. The piece 52 contains notches or V-grooves 54 which are located from end 56 which has been made square to within .0002 inch. The closed ends of these notches or the apices of the V-grooves are all located to within .0002 inch variation from the square end of the sleeve. That is, there cannot be more than .0002 inch deviation in the vertical height of these V-grooves. Where the notches are V-shaped as shown in the drawings unusually close tolerances can be maintained. This is in part due to the fact that the slots can be ground in the ends of the sleeves. That is, where a grinding operation is used, such as in the instant case, a large radius wheel may be employed which tends to minimize the wear and deterioration of the tool (grinding wheel), thus producing the highest possible accuracy. Also where slots are machined in the end in accordance with my method greater accessibility to the part is assured and hence more accurate machining is guaranteed. The end of the piece 50 opposite the flange 28 is squared to within .0002 inch and milled to furnish an annular groove 57 into which a copper ring 58 is placed for brazing the pieces 50 and 52 together. Brazing is accomplished by holding the squared ends of the two pieces together and placing the assembly in a brazing furnace. This closes the open ends of the notches to thereby form the orifices 26. The copper ring 57 which extends across the open ends of the V-grooves is, of course, melted away during the brazing process. It should be understood that any suitable means, other than brazing, may be employed for holding the squared ends of the pieces 50 and 52 in abutting relationship.

The end 60 of the piston 36 is made square to within .0002 inch to insure a high degree of accuracy in metering when assembled as indicated in Figure 1. With this arrangement of piston and sleeve any movement of the former will uncover equal areas between the orifices to thereby proportion equally the amounts of fluid passing therethrough. A minimum clearance of .0001 inch and a maximum clearance of .0003 is allowed between the piston and sleeve.

Figure 5:
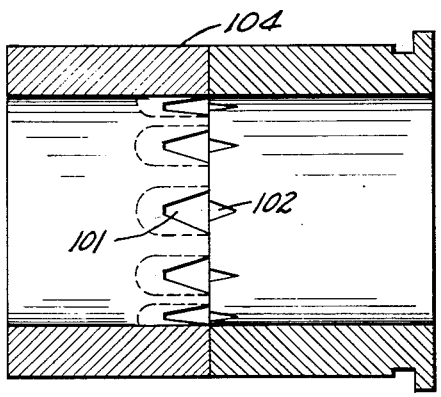
Figure 5 is a modified form of the device of the invention.

The modified form of the device shown in Figure 5 exemplifies orifices 101 and 102 in both portions of sleeve 104. These orifices may be of any size or shape depending on the flow demands. To distinguish from the orifices 26 in Figure 1, the orifices of Figure 4 are made of V-slots of different sizes.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. A method of forming a metal sleeve with orifices therein which comprises squaring one end of a first sleeve, cutting V-shaped notches in said one end of the sleeve with the vertices of the respective notches being located to within .0001 inch plus or minus of a predetermined distance from said square end of the sleeve, squaring one end of a second sleeve, milling a groove in said one end of the second sleeve, placing a ring of copper in said groove, bringing the squared ends of the sleeves into contact relationship, and placing the sleeves in a brazing furnace.

2. The method of making a fluid metering device having orifices adapted to distribute the fluid in equal amounts which comprise squaring one end of a sleeve, forming a plurality of notches in said one end thereof and spaced apart circumferentially a predetermined distance, with the closed end of the respective notches being located to within .0001 inch plus or minus of a predetermined distance from said one end, then squaring one end of a second sleeve and securing the same to the said one end of the first mentioned sleeve to thereby close the open ends of the notches to thereby form a unitary hollow member, squaring one end of a piston to within .0002 inch and finishing the diameter to a tolerance of plus .0001 inch minus .0003 inch, inserting the piston into the hollow member, and closing an end of said hollow member for subjecting the interior thereof to a fluid pressure source.

3. The method of manufacturing and assembling a flow divider for fluids having a plurality of variable orifices located in a hollow member with the individual orifices adapted to communicate with a burner and with one end of said hollow member adapted to be connected to a source of fluid under pressure, and a piston positionable in the hollow member in accordance with the pressure of the fluid acting in said hollow member and on one end of said piston comprising squaring one end of a first sleeve, cutting notches in said one end of the sleeve, squaring one end of a second sleeve and securing said squared end in abutting relationship to said one end of the first sleeve to thereby form a unitary hollow member, securely positioning said hollow member in a housing with the orifices of the former in registry with openings in the housing, squaring one end of said piston and placing the same in said hollow member with the squared end of the former arranged to slide over said orifices to thereby uncover equal areas.

4. The method of forming orifices in a hollow member fabricated from two cylindrical parts which comprises the steps of squaring one end of one of said cylindrical parts, accurately cutting a plurality of notches to a prescribed depth and at predeterminately spaced intervals in said squared end, squaring one end of the other of said cylindrical parts, and brazing said last mentioned squared end to said squared and notched end of said first mentioned cylindrical part to thereby form a unitary hollow member having a plurality of flow orifices in the wall forming the hollow member.

References Cited in the file of this patent

UNITED STATES PATENTS

| Number | Name | Date |
|---|---|---|
| 370,100 | Stimpson | Sept. 20, 1887 |
| 1,070,889 | Hartog | Aug. 19, 1913 |
| 1,801,171 | Mueller | Apr. 14, 1931 |
| 1,934,964 | Brogger | Nov. 14, 1933 |
| 2,010,673 | Lahr | Aug. 6, 1935 |
| 2,158,737 | Wunsch | May 16, 1939 |
| 2,205,494 | Schindler | June 25, 1940 |
| 2,211,646 | Cole | Aug. 13, 1940 |
| 2,295,111 | Hemmings | Sept. 8, 1942 |
| 2,376,931 | Matson | May 29, 1945 |
| 2,378,562 | Lahr | June 19, 1945 |
| 2,547,168 | Nill | Apr. 3, 1951 |
| 2,586,673 | Liuxweiler | Feb. 19, 1952 |